United States Patent [19]

Kinosky

[11] Patent Number: 4,873,139

[45] Date of Patent: Oct. 10, 1989

[54] CORROSION RESISTANT SILVER AND COPPER SURFACES

[75] Inventor: David S. Kinosky, Austin, Tex.

[73] Assignee: Minnesota Mining and Manufacturing Company, St. Paul, Minn.

[21] Appl. No.: 174,837

[22] Filed: Mar. 29, 1988

[51] Int. Cl.$^4$ ............................................. B32B 27/06
[52] U.S. Cl. .................................... 428/341; 428/413; 428/419; 428/461
[58] Field of Search ............... 428/379, 403, 413, 419, 428/461, 341, 626

[56] References Cited

U.S. PATENT DOCUMENTS

| | | | |
|---|---|---|---|
| 2,457,186 | 7/1949 | Kamlet | 437/170 |
| 3,330,672 | 7/1967 | Kroll et al. | 106/3 |
| 3,361,581 | 1/1968 | Drescher | 106/11 |
| 3,365,312 | 1/1968 | Norwack | 106/3 |
| 3,506,699 | 4/1970 | Viventi | 556/426 |
| 3,640,736 | 2/1972 | Warner et al. | 106/3 |
| 3,663,561 | 5/1972 | Blake | 548/142 |
| 3,687,713 | 8/1972 | Adams | 428/623 |
| 4,020,028 | 4/1977 | Dudley | 204/181.6 |
| 4,058,362 | 11/1977 | Sinclair | 422/8 |
| 4,136,074 | 1/1979 | Dudley | 204/181.7 |
| 4,234,304 | 11/1980 | Heytmeijer | 431/359 |
| 4,240,925 | 12/1980 | Tait | 148/6.15 R |
| 4,255,214 | 3/1981 | Workens | 148/6.14 |
| 4,343,660 | 8/1982 | Martin | 148/6.14 R |
| 4,357,392 | 11/1982 | Reed et al. | 428/480 |
| 4,357,396 | 11/1982 | Grunewalder et al. | 428/626 |
| 4,654,714 | 2/1987 | Roche et al. | 428/458 |
| 4,731,128 | 3/1988 | Casullo | 428/470 |

FOREIGN PATENT DOCUMENTS

| | | | |
|---|---|---|---|
| 163558 | 10/1982 | Japan . | |
| 53332 | 3/1986 | Japan | 428/461 |

*Primary Examiner*—Melvyn J. Andrews
*Assistant Examiner*—George Wyszomierski
*Attorney, Agent, or Firm*—Donald M. Sell; Walter N. Kirn; James V. Lilly

[57] ABSTRACT

Techniques are described for rendering silver and copper surfaces of various articles resistant to corrosion. The surfaces are contacted with compounds selected from the group consisting of 2-mercaptobenzoxazole and 1-phenyl-1H-tetrazole-5-thiol. Abrasion-resistant coatings are preferably applied to the silver and copper surfaces. The corrosion inhibiting compound may be included in the abrasion-resistant coating.

6 Claims, No Drawings

CORROSION RESISTANT SILVER AND COPPER SURFACES

FIELD OF THE INVENTION

This invention relates to techniques for imparting corrosion resistance to silver and copper surfaces. More particularly, this invention relates to providing corrosion resistance to silver and copper surfaces by coating such surfaces with corrosion inhibiting compounds.

BACKGROUND OF THE INVENTION

Silver and copper are widely used in a variety of product applications. Unfortunately, where these metals are exposed to the atmosphere they typically corrode or tarnish quite rapidly due to the presence of oxidizing materials and sulfides. They also corrode when exposed to components of perspiration (e.g., chloride ions and acids).

The tarnishing or corroding of these metallic surfaces is not only unsightly, it also interferes with desirable physical properties of the article. For example, plastic film bearing a silver surface coating is very useful as static shielding in packaging applications. However, when the silver coating corrodes it loses its conductivity and becomes worthless for its intended use. Also, when the silver layer in a mirror becomes corroded or tarnished the mirror loses its effectiveness and primary utility. Similarly, in many other product applications, the tarnishing or corroding of a silver or copper surface or layer is regarded as very detrimental.

Over the years a number of compounds or compositions have been proposed for treating silver and copper surfaces. See, for example, U.S. Pat. Nos.: 2,475,186; 3,330,672; 3,361,581; 3,365,312; 3,506,699; 3,640,736; 3,663,561; 3,687,713; 4,058,362; 4,234,304; 4,255,214; 4,357,396; and 4,645,714. However, none of these patents have described the use of the compounds or compositions described herein.

SUMMARY OF THE PRESENT INVENTION

In accordance with the present invention there is provided a technique for imparting corrosion resistance to silver and copper surfaces by contacting such surfaces with a compound selected from the group consisting of a 2-mercaptobenzoxazole and 1-phenyl-1H-tetrazole-5-thiol.

In a preferred aspect the corrosion inhibiting compound on the silver or copper surface is either covered by an abrasion-resistant coating or is incorporated into the abrasion-resistant coating. The coating is a film-forming material which may be, for example, a curable resin.

The types of articles which may be treated using the techniques of this invention vary widely. For example, the articles may be plastic films having thin surface layers of silver or copper, or fibers, or mirrors, or microspheres, metallic sheets, etc. Articles of these types may have a variety of utilities.

The techniques of the invention are useful in increasing the lifetime and reliability of silver or copper coatings when exposed to perspiration, elevated temperatures, humidity, or chloride or sulfide ions, by inhibition of deterioration and oxidation of the metal layer.

DETAILED DESCRIPTION OF THE INVENTION

In the present invention silver and copper surfaces can be treated so as to be rendered corrosion-resistant. The compounds which are useful for this purpose are 2-mercaptobenzoxazole and 1-phenyl-1H-tetrazole-5-thiol.

The silver or copper surface may be contacted by the corrosion inhibiting compound in a variety of ways. For example, the compound may be dissolved in a suitable solvent to form a solution which may be applied to the silver or copper surface, e.g., by spraying, wiping, dipping, flooding, etc. It is also possible to apply the compound to the silver or copper surface by vapor deposition, e.g., by sublimation of the compound in an atmosphere in which the silver or copper surface is located.

The amount of corrosion inhibiting compound applied to the metallic surface is at least about 0.001 gram per square meter of metal surface. Greater amounts may, of course, be applied, if desired.

Preferably an abrasion-resistant coating is applied to the metallic surface over the corrosion inhibiting compound. The coating not only protects the treated metallic surface from abrasion but it also assists in increasing the corrosion resistance of the metallic surface, e.g., by retarding or preventing moisture penetration.

Even more preferably the corrosion inhibiting compound is included in the abrasion-resistant coating composition to be applied to the metallic surface. In other words, the corrosion-inhibiting compound may be simply admixed with the coating composition which is then coated onto the metallic surface to be rendered corrosion resistant. When the coating is applied to the metallic surface and hardened it becomes adhered to the metallic surface. The corrosion-inhibiting compound is then firmly and securely retained on the metallic surface to thereby provide corrosion resistance to the metallic surface.

The types of abrasion-resistant coatings which are useful in the present invention vary widely. The coating material or resin must be film forming and solid on the metallic surface.

The coating may comprise a solid which is dissolved in solvent to facilitate coating onto the metallic surface, after which the solvent is removed to leave a solid continuous coating covering the metallic surface. Representative coatings of this type include acrylic resins, polyester resins, epoxy resins, etc. The coating weight may vary, for example, from about 0.05 to 2 grams per square meter.

In another embodiment the coating comprises a curable resin. After the resin is applied to the metallic surface it is cured to provide a solid coating which is adhered to the metallic surface. Representative examples of this type of resin include acrylates, epoxides, radiation-curable vinylpyrrolidone (e.g., GAFGARD 233 from GAF Corp.), polythiol/polyenes, and other curable resins known in the art. The coatings may be cured in various manners. For example, they may be two-part curable compositions. Preferably they are one-part, radiation-curable compositions. The coating weight may vary, for example, from about 0.25 to 5 grams per square meter. More preferably the coating weight is in the range of about 0.5 to 1 gram per square meter.

The amount of corrosion-inhibiting compound included in solvent-based coating compositions is preferably in the range of about 1 to 15% by weight of the solids. The amount of corrosion inhibiting compound provided on the metallic surface is preferably in the range of about 0.001 to 0.1 gram per square meter.

The amount of corrosion inhibiting compound included in the curable coating compositions is preferably in the range of about 0.05 to 5% by weight of solids of the curable coating composition. The amount of corrosion inhibiting compound provided on the metallic surface is preferably in the range of about 0.01 to 0.15 grams per square meter when the compound is included in a solventless curable coating composition.

If desired, a primer may be applied to the metallic layer to increase the degree of adhesion between the metal and the coating composition.

The articles which include a surface layer of silver or copper which may be treated in accordance with the techniques of this invention may be of any type. For example, representative articles include plastic films, mirrors, fibers, microspheres, metallic sheets, etc.

Plastic films which have a thin layer of silver thereon have utility in many applications. For example, they may be used as static shielding films or bags or as electromagnetic interference shielding films. They may also be used in other applications such as reflective window coverings, touch-sensitive switches and screens, etc.

Fibers which have silver or copper surface layers are useful, for example, in the production of conductive wrist bands. They also may be woven into garments for static dissipation characteristics. They may also be used in woven fabric used for thermal insulation. They also may be included in non-woven fabric for electromagnetic shielding purposes.

Microspheres which have a surface layer of silver are useful, for example, as electrically conductive filler for electromagnetic shielding in plastics. They may also be used in paints because they are lighter and less expensive than solid metal particles.

Articles having silver or copper surfaces are also useful in various electrical and electronic circuits where corrosion resistance is required. For example, silver or copper surfaces may be present in various printed circuit boards and in screen printed inks, and in these applications the protection of the metallic surface is important.

The manner in which the silver or copper layer is applied to the article is not important. For example, the metal layer may be applied by vacuum deposition (e.g., evaporation, sputtering, ion-plating, etc.), or chemical reduction of a metal salt, or by conventional plating techniques.

The invention is further illustrated in the following examples.

EXAMPLE 1

A series of curable coating compositions were prepared containing varying amounts of 2-mercaptobenzoxazole as a corrosion inhibitor. The coating compositions were UV-curable and were applied to separate samples of polyester film (0.92 mil thick) having a thin layer of silver on one surface (60% visible light transmission, 10 ohms per square electrical resistivity).

The coating composition contained the following ingredients in the amounts stated, in parts by weight:

| Parts | Ingredient | Type | Supplier |
| --- | --- | --- | --- |
| 42.8 | "Cyracure UVR-6100" | Base Epoxide Resin | Union Carbide |
| 42.8 | "Cyracure UVR-6379" | Epoxide Flexibilizer | Union Carbide |
| 10.0 | "Cyracure UVR-6200" | Epoxide Diluent | Union Carbide |
| 4.0 | "FX-512" | Photoinitiator | 3M |
| 0.4 | "FC-171" | Surfactant | 3M |
| 100.0 | | | |

This composition is UV-curable.

A corrosion inhibiting compound was added to separate samples of the coating composition, as shown in TABLE I.

TABLE I

| Inhibitor | Formula Weight | Moles Per Kg | Weight Inhibitor | Percent Resin |
| --- | --- | --- | --- | --- |
| 2-mercaptobenzoxazole | 151.2 | 0.01 | 0.15 | 99.85 |
| | | 0.06 | 0.91 | 99.09 |
| | | 0.10 | 1.51 | 98.49 |

The separate coating compositions were then coated onto separate samples of the silver coated polyester film described above using a #3 wire wound coating rod. The samples were then cured under UV lamps until no longer tacky and were then post-cured for 24 hours under room conditions.

The resultant samples were cut into 4"×6" (10 cm. by 15 cm.) strips and touched so as to leave fingerprints on the coating surface, after which the samples were suspended in an environmental chamber and cycled from 20° C. to 65° C., 90% relative humidity, twice daily for 5.5 hours each cycle for four days. Between the high temperature cycles the temperature was lowered to room ambient and the humidity was not controlled.

These test conditions were established so as to accelerate corrosive reaction. Corrosive contaminants such as chloride ions from finger contact diffuse through the coating to the metal surface. Also, sulfide ions such as those resulting from air pollution can cause deterioration of the metal surface.

Evaluation of the samples was done visually, generally in comparison with a control sample where the metallized film was coated with the above coating composition having no corrosion inhibiting compound present.

The results observed are shown in TABLE II.

TABLE II

Corrosion Results
Samples Rated Visually 1 to 10 (10 showing no corrosion)

| | Rating |
| --- | --- |
| 0.15% inhibitor | 6 |
| 0.91% inhibitor | 8 |
| 1.15% inhibitor | 7.5 |
| 0% inhibitor | 3 |

EXAMPLE 2

The metallized polyester film described in Example 1 was coated with separate samples of a UV-curable composition having the ingredients list below, with varying amounts of corrosion inhibiting compound present.

| Parts | Ingredient | Type | Supplier |
|---|---|---|---|
| 100 | OPL-6C | Polythiol-polyene (radiation curable resin) | W. R. Grace |

A corrosion inhibitor (1-phenyl-1H-tetrazole-5-thiol) was added in different amounts to separate samples of the coating composition. The different amounts added, in weight percent, were: 0, 0.54, 1.78, 3.03, and 3.56.

The coating compositions were coated onto separate samples of the metallized film using an offset gravure. The thickness of the coatings was varied by changing the speed of the gravure roll.

After the coatings were cured the samples were touched to provide fingerprints thereon. Some of these samples were then aged for 10 days at 50° C. and 95% relative humidity. Still other samples were (a) dipped into a saline solution containing sodium chloride (0.25%), lactic acid (0.025%), lauric acid (0.75%) and water (0.975%) in methyl alcohol, and (b) aged for seven days at 65° C. and 95% relative humidity.

Multiple regression analysis of the results indicated a strong positive correlation between corrosion resistance and inhibitor concentration.

EXAMPLE 3

The metallized polyester film prepared as described in Example 1 was coated with separate samples of a solvent borne coating composition having the ingredients listed below:

| Parts | Ingredient | Type | Supplier |
|---|---|---|---|
| 2.5 | "Vitel PE 200" | Polyester | Goodyear |
| 97.5 | Methylethylketone:toluene (1:1) | Solvent | |

A corrosion inhibitor (2-mercaptobenzoxazole) was added in different amounts to separate samples of the coating composition. The different amounts added, in weight percent of solids, were: 0, 1.2, 2.94, 5.70, 10.79, and 15.38.

The coating compositions were applied to separate samples of the metallized film using a #3 wire wound coating rod (using a hand spread coater). The samples were dried for five minutes at 50° C.

Two coated samples of each type were then dipped in saline and one sample of each type was fingerprinted. Then the samples were cycled for three days at 65° C. at 90% relative humidity. The corrosion results are shown in TABLE III.

TABLE III

| % Inhibitor | Ohms Per Square | | |
|---|---|---|---|
| | Saline | Saline | Fingerprints |
| 0 | NM* | NM* | 166 |
| 1.2 | 30 | 124 | 102 |
| 2.94 | 19 | 93 | 19 |
| 5.70 | 17 | 12 | 12 |
| 10.79 | 12 | 12 | 20 |

TABLE III-continued

| % Inhibitor | Ohms Per Square | | |
|---|---|---|---|
| | Saline | Saline | Fingerprints |
| 15.38** | 15 | 13 | 302 |

Initial resistivity of the film was measured as 11-12 ohms per square.
*Not measurable, but greater than 100,000 ohms per square.
**Some loss of adhesion of the coating from the film was possible.

EXAMPLE 4

Yarn from Sauquoit, Inc. (163 denier including 7 silver plated fibers) was tested in various manners. One sample was dipped into a solution comprising 0.08% by weight 2-mercaptobenzoxazole and 0.25% Vitel PE 200 (polyester resin) in MEK:toluene (1:1) and then dried. Another sample was dipped into a solution containing 0.24% of the same inhibitor in MEK:toluene (1:1). A control sample was not treated.

All samples were then dipped into artificial perspiration solution (AATCC TM 15-1979), dried, and then suspended in environmental chambers with double loops of thread supporting weights of 25, 50, 100, 150, 200, 300, and 450 grams. The samples were cycled twice daily to 65° C. at 90% relative humidity for ten days.

Electrical resistivity was measured as ohms per centimeter of length over 10 cm. of length with multiple measurements on each 70 to 80 cm. sample. The initial value was 25 ohms per centimeter. Treated samples had a significantly reduced number of high resistance sections, as detailed in TABLE IV.

TABLE IV

| | Untreated | Inhibitor | Inhibitor & Resin |
|---|---|---|---|
| No. of Samplings | 59 | 56 | 51 |
| No. <1000 ohms/cm. | 13 | 53 | 49 |
| No. >1000 ohms/cm. | 46 | 3 | 2 |

Other variants are possible without departing from the scope of the present invention.

What is claimed is:

1. An article comprising a plastic film having a layer of silver supported thereon, wherein said silver layer has been contacted with a compound selected from the group consisting of 2-mercaptobenzoxazole and 1-phenyl-1H-tetrazole-5-thiol; wherein said compound is present on said silver layer in an amount of at least about 0.001 gram per square meter; and further comprising a film-forming coating on said silver layer.

2. An article in accordance with claim 1, wherein said coating comprises a cured resin.

3. An article having a metallic surface layer selected from the group consisting of silver and copper, said surface bearing a corrosion inhibiting layer comprising a compound selected from the group consisting of 2-mercaptobenzoxazole and 1-phenyl-1H-tetrazole-5-thiol; and further comprising a film-forming hardenable resin layer over said corrosion inhibiting layer.

4. An article in accordance with claim 3, wherein said corrosion inhibiting layer is continuous.

5. An article in accordance with claim 3, wherein said resin is radiation-curable.

6. An article having a metallic surface comprising silver or copper, wherein said surface has been contacted with a compound consisting essentially of 2-mercaptobenzoxazole; wherein said compound is present on said surface in an amount of at least about 0.001 gram per square meter; and further comprising a film-forming hardenable resin layer over said surface.

* * * * *